United States Patent [19]

Teranishi

[11] Patent Number: 4,742,405
[45] Date of Patent: May 3, 1988

[54] DEVICE FOR STORING AND RETRIEVING CASSETTES

[75] Inventor: Shunichi Teranishi, Anjo, Japan

[73] Assignee: Aisin Sekik Kabushiki Kaisha, Aichi, Japan

[21] Appl. No.: 844,037

[22] Filed: Mar. 25, 1986

[30] Foreign Application Priority Data

Mar. 25, 1985 [JP] Japan .................. 60-060452

[51] Int. Cl.⁴ .............................. G11B 15/68
[52] U.S. Cl. ...................... 360/92; 360/69; 360/137
[58] Field of Search ............ 360/92, 137, 69; 769/38, 39

[56] References Cited

U.S. PATENT DOCUMENTS

| | | | |
|---|---|---|---|
| 3,938,190 | 2/1976 | Semmlow et al. | 360/92 |
| 4,075,669 | 2/1978 | Louzil et al. | 360/92 |
| 4,287,541 | 9/1981 | Tanahashi et al. | 360/92 |

FOREIGN PATENT DOCUMENTS

| | | | |
|---|---|---|---|
| 54-137307 | 10/1979 | Japan | 360/92 |
| 55-157156 | 6/1980 | Japan | 360/92 |

*Primary Examiner*—John H. Wolff
*Attorney, Agent, or Firm*—Sughrue, Mion, Zinn, Macpeak & Seas

[57] ABSTRACT

A device for storing and retrieving cassettes includes a casing in which a plurality of cassettes are stored in a radial array about a vertically disposed axis. A carrier for transferring a selected cassette from the casing to a processor is pivotally mounted on the same axis as the casing for rotational movement about said axis. The carrier device is vertically moveable for alignment with different radial arrays of cassettes and the carrier is provided with a cassette gripper device which is horizontally moveable into said casing for gripping a selected cassette. The cassette gripping means is also mounted for rotational movement about a horizontal axis on the carrier device so that the cassette gripped thereby may be rotated to present one side or the other of a double sided disc within the cassette for processing.

3 Claims, 7 Drawing Sheets

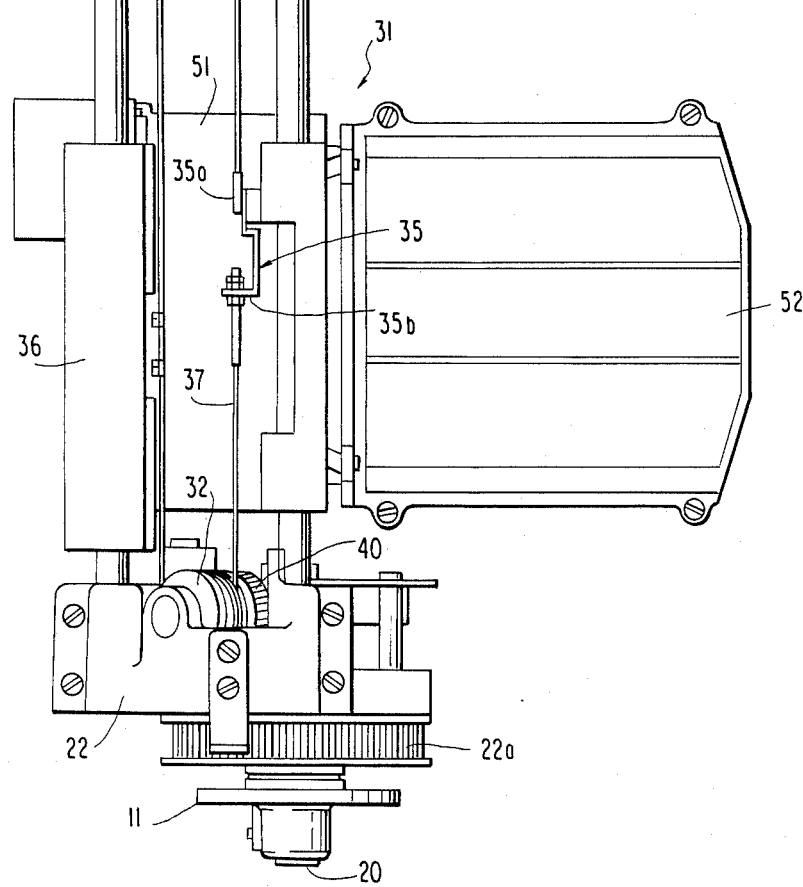
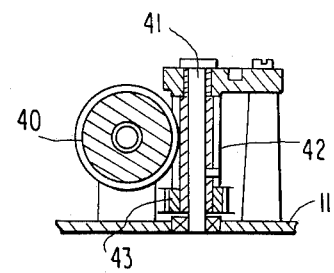
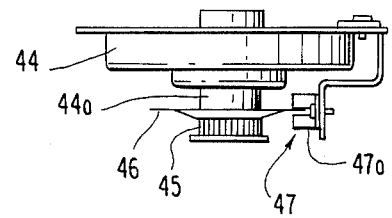
FIG. 4
FIG. 6
FIG. 7

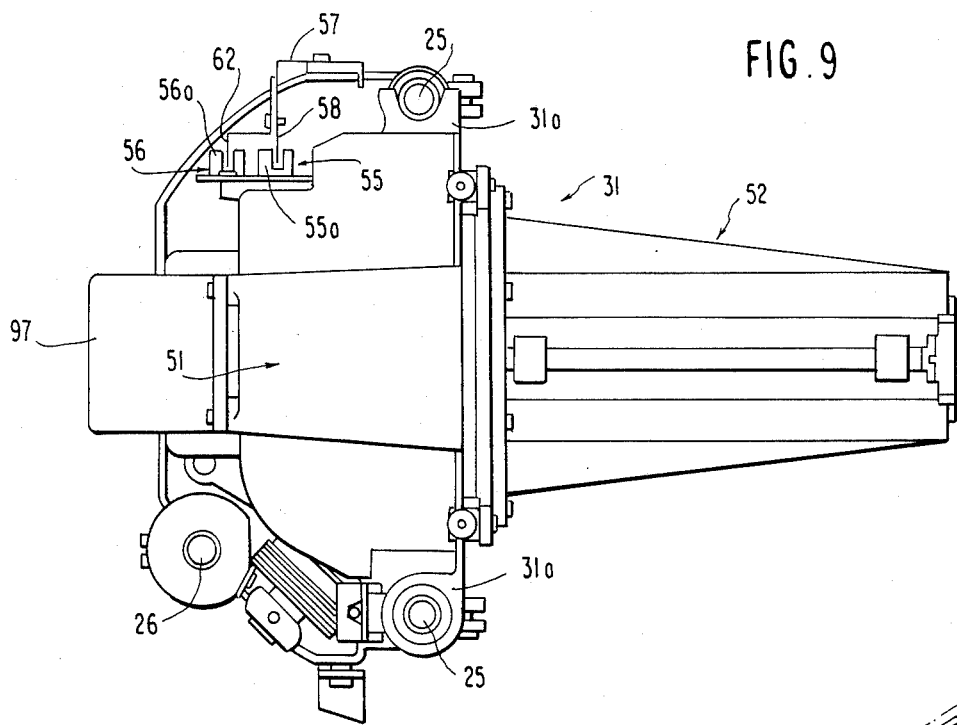
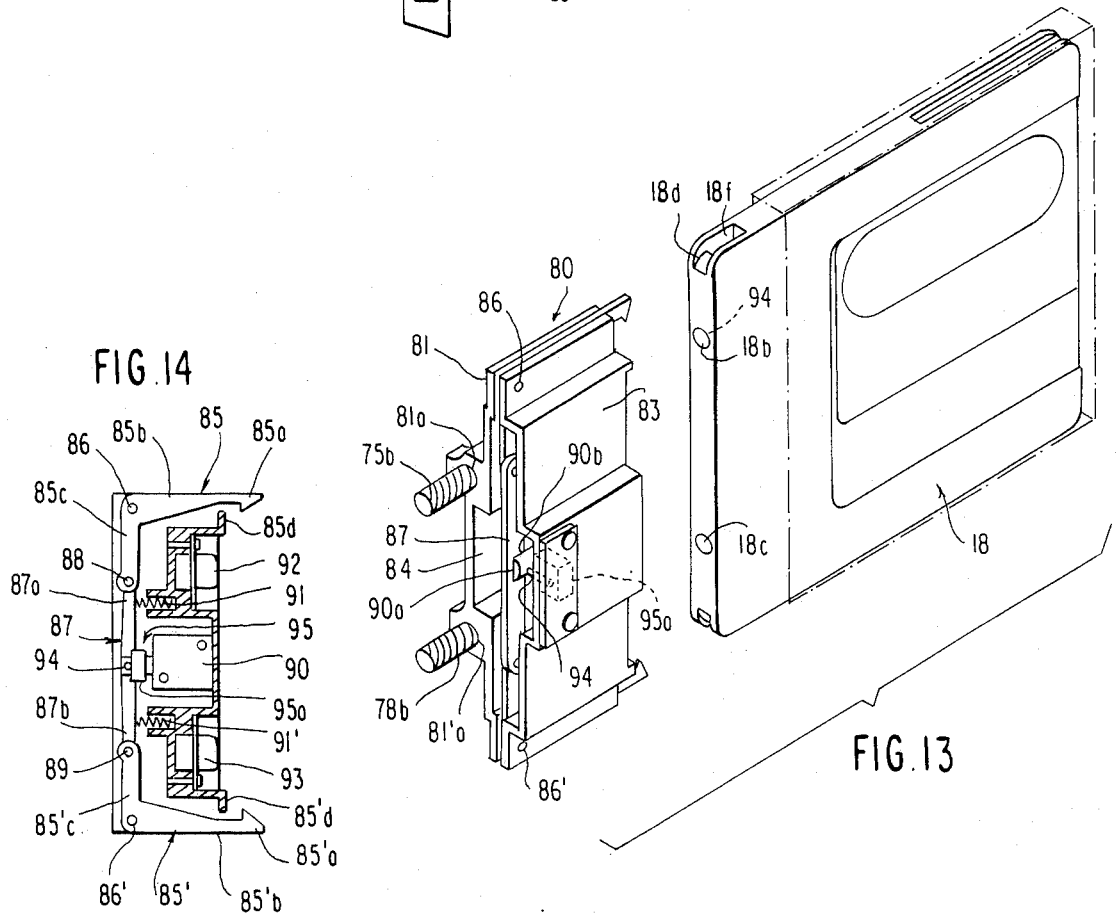

DEVICE FOR STORING AND RETRIEVING CASSETTES

BACKGROUND OF THE INVENTION

The present invention is directed to a device for storing and retrieving cassettes and more specifically to a device in which any one of a plurality of cassettes can be accessed at random, transferred to a processing device, inserted therein with a selected orientation and returned subsequent to processing.

A conventional device of this type is disclosed in Japanese Patent Application No. 59-92741 which was published on May 28, 1984. The conventional device is provided with a cylindrical casing in which a plurality of cassettes are radially arranged. A coder is installed at the center of the casing and a carrier is provided for transferring any one of the cassettes from the casing to the coder and vice versa. However this conventional device is limited since only one side of the disk in the cassette can be utilized since the cassette cannot be reversed during transfer from the storage compartment to the coder.

SUMMARY OF THE INVENTION

The present invention provides a new and improved device for storing and retrieving cassettes which overcomes the limitations of the above described conventional device. More specifically the present invention provides for storing and retrieving cassettes wherein a selected cassette can be turned over or reversed during the transfer thereof from a storage compartment to the coder.

The present invention provides a new and improved device for storing and retrieving cassettes which includes a base plate, a casing including a plurality of vertically stacked sections provided with a sector configuration for storing a plurality of radially disposed cassettes, guide means comprising a block member pivotally mounted for rotation about an axis corresponding to the axis of said sectors and a pair of parallel spaced apart guide rails extending upwardly from the block member, a first driving means for rotating said block member about said axis through any desired angle, carrier means including a main body mounted on said guide rails for movement therealong, a gripper rotatably mounted on said main body including a holder moveably mounted in said gripper for holding any one of said cassettes, a second driving means for moving said main body of said carrier means in the vertical direction along said guide rails, a third driving means for moving said holder relative to said gripper, a fourth driving means for rotating said gripper relative to said main body during transfer of said carrier means to a loading position, coding means for playing back or recording a selected cassette held in said carrier and central control means for controlling said first, second, third and fourth driving means.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 4 is a front elevation view showing the guide means and carrier means without the cassette storing means and coder.

FIG. 6 is a detailed sectional view of the gearing associated with the device as illustrated in FIG. 5.

FIG. 7 is a partial elevational view showing the sensing means for detecting the location of the carrier shown in FIGS. 4 and 5.

FIG. 9 is a top plan view of the carrier means shown in FIG. 4.

FIG. 13 is an exploded perspective view of a holder and a cassette to be held thereby.

FIG. 14 is a vertical sectional view of the holder as shown in FIG. 13.

DETAILED DESCRIPTION OF THE INVENTION

Figure 2:
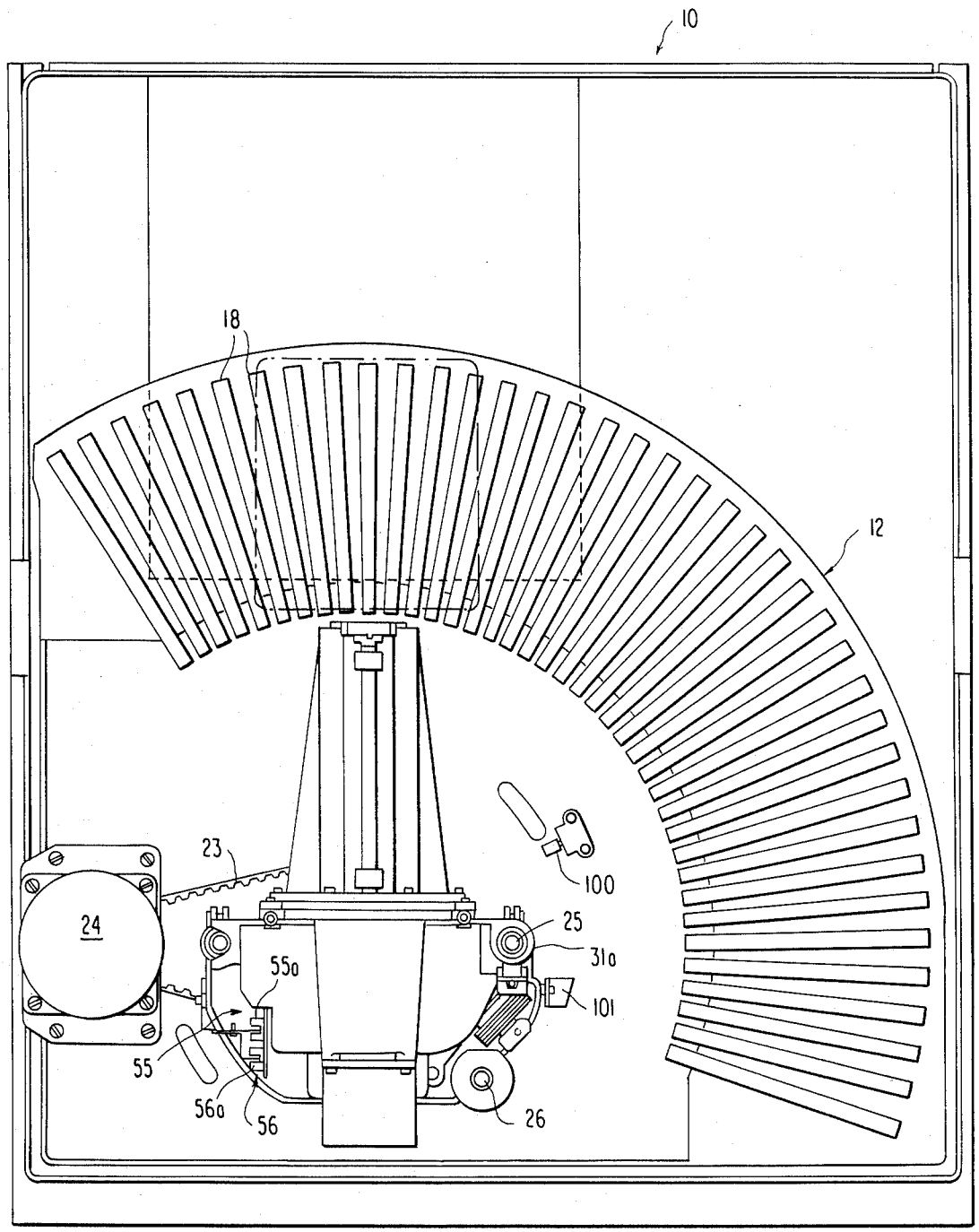
FIG. 2 is a plan view of the device shown in FIG. 1.
Figure 3:
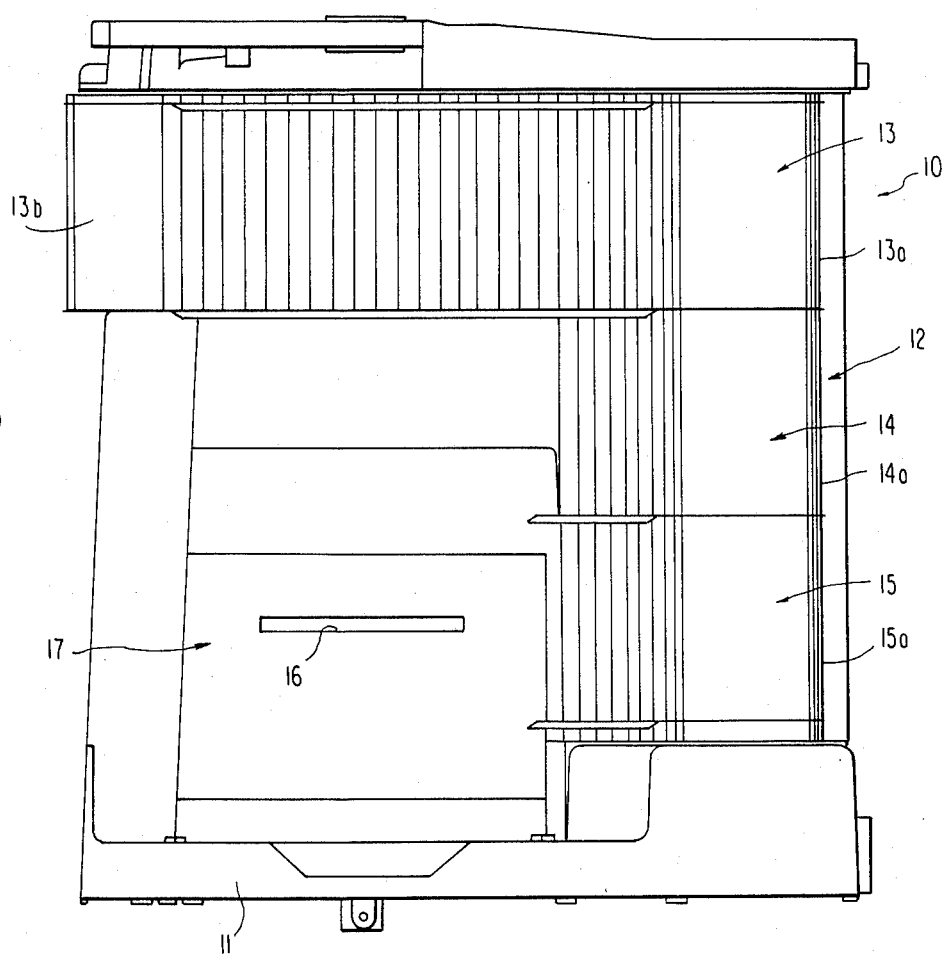
FIG. 3 is a front elevation view of the storing and coding device without the cassette handling device.
Figure 5:
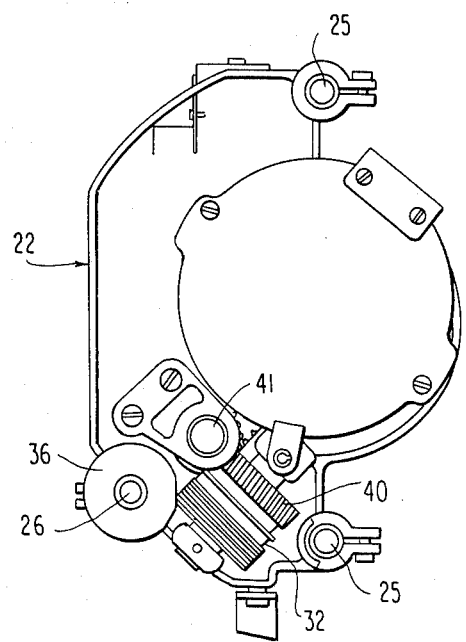
FIG. 5 is a bottom plan view showing a portion of the device as illustrated in FIG. 4.

The device 10 for storing and retrieving cassettes in accordance with the present invention is provided with a base plate 11 on which a casing 12 is mounted by any suitable means. The casing 12 includes three vertically stacked sections 13, 14 and 15, each of which has a sector configuration with each of the sectors having a common axis. Each section is divided into a plurality of vertically disposed slots which are radially oriented about the axis of the sectors. Each slot is adapted to receive the cassette 18 in which a double-recorded laser or optical disc is located. Thus the cassette will be radially disposed about the axis of the sectors as shown in FIG. 2. Either side of the disc in the cassette 18 may be played back and/or recorded in a suitable processing device 17 such as a coder or player.

Figure 8:
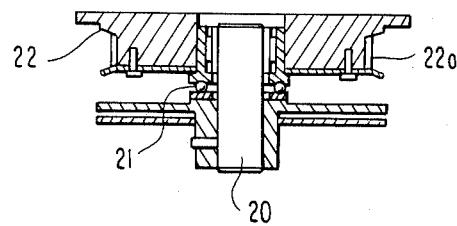
FIG. 8 is a detailed sectional view showing the supporting arrangement between the block member and the base plate.
Figure 10:
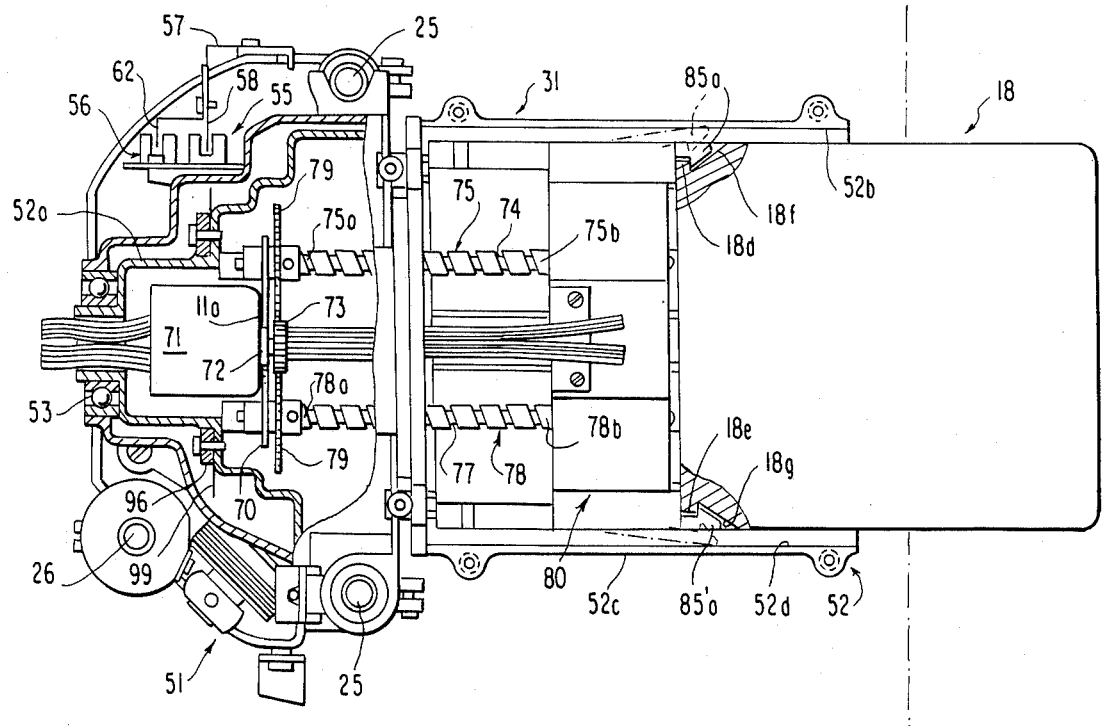
FIG. 10 is a cross sectional view of the carrier means as shown in FIGS. 4 and 9.
Figure 16:
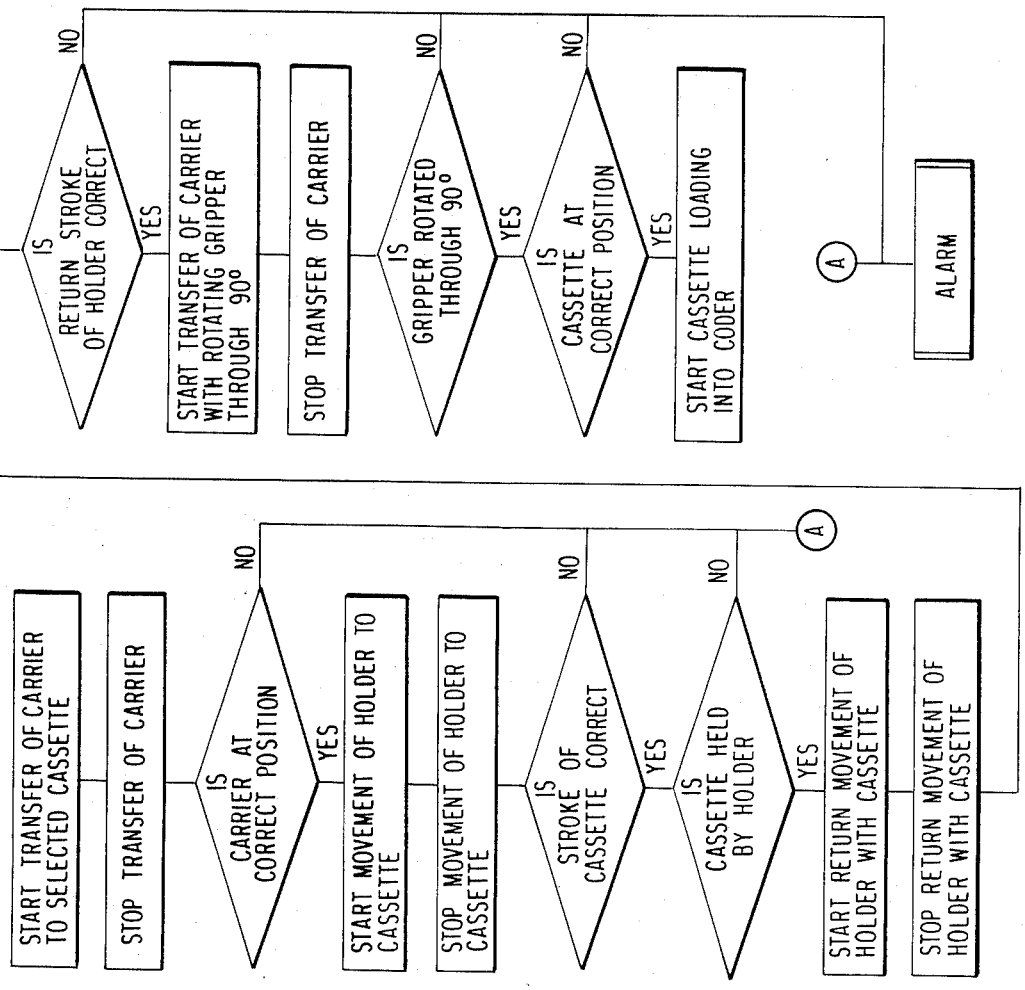
FIG. 16 is a flow chart showing the operation of the device according to the present invention.
Figure 15:
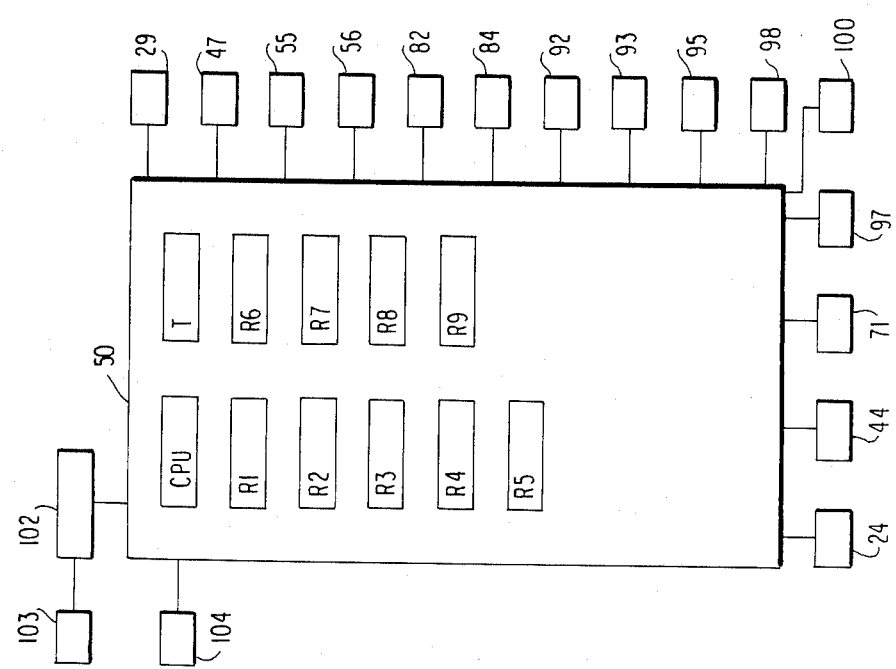
FIG. 15 is a block diagram of the control means for the device according to the present invention.

In order to insert the cassette 18 which is automatically selected or manually selected by an operator into the processing device 17 through an opening 16 therein, cassette carrier 31 is provided. The carrier 31 includes a main body 51, a gripper 52 rotatably connected to the main body 51 by means of a bearing 53 and a cassette holder 80 which is moveably mounted in the gripper 52 as best seen in FIG. 10. The main body 51 of the carrier 31 is provided at the opposite end portions thereof with a pair of ear portions 31a, 31a which are moveably mounted on a pair of parallel spaced apart rails 25, 25, both of which extend vertically upwardly from a common support member 22. The support member 22 is pivotally mounted in the base plate 11 by means of a pin 20 which is shown in FIG. 8. The vertical axis of the pin 20 is coaxial with the axis of each sector 13, 14, and 15.

The support member 22 is provided with a toothed portion 22a which is operatively connected to the drive shaft by a stepping motor 24 by means of a timing belt 23 for rotating the support member 22 about the pin 20. A retainer 35 is fixed to the eared portions 31a of the carrier 31 and is operatively connected to a counter balance 36 which is slidably mounted on a shaft 26 by means of wires 37 and 38. The wire 38 extends about a pulley 34 which is rotatably supported in a cap member 27 and the wire 37 extends about a pulley 32 which is rotatably mounted on the support member 22 as best seen in FIG. 4. The pulley 32 is integrally connected to the gear 40 which is in engagement with the worm gear 42. The worm gear 42 is integrally formed with a gear 43 and the gears 42 and 43 are rotatably mounted on a common shaft 41 as best seen in FIG. 6. The gear 42 is operatively connected to a gear 45 secured to the shaft 44a of a stepping or pulse motor 44, as seen in FIG. 7, so as to move the carrier 31 in the vertical direction along the rails 25, 25.

Figure 1:
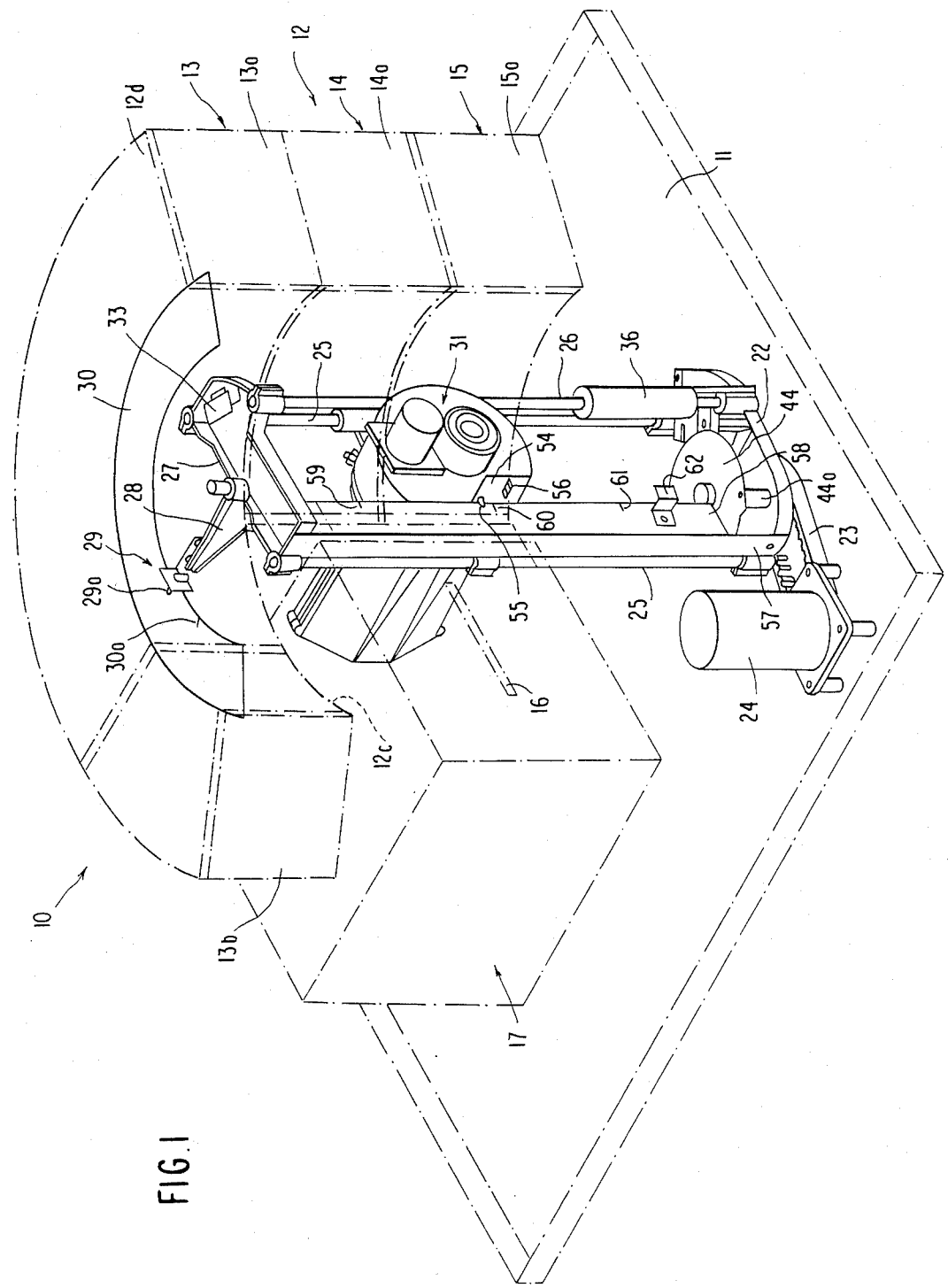
FIG. 1 is a perspective view of a device for storing and retrieving cassettes according to the present invention.

Each space in which a cassette 18 is stored is represented by coordinates (V, M) which correspond with the identification number of the cassette 18. The coordinate V can be 1, 2, or 3, to indicate the upper section 13, the middle section 14, and the lower section 15, respectively, and the coordinate M may be any one of a consecutive number or integer which extend from left to right in each section and identify the individual compartments. Upon selection of any one of the cassettes 18, the corresponding compartments or identification number for the selected cassette is transmitted from a suitable input device such as a keyboard or the like to the CPU of a computer 50. The carrier 31 is then moved upwardly by the motor 44 and is rotated about the vertical axis by means of the motor 24 so as to be aligned with the selected cassette 18. In order to determine whether the carrier 31 is brought into alignment with the desired cassette 18 a vertically extending plate 58 is mounted on support member 22 and is provided with a plurality of equally spaced slits 59, 60 and 61 along a vertically disposed edge thereof. A detector 55 having bifurcated detecting portions 55a is secured to the carrier 31 and encompasses the vertically disposed edge of the plate 58 having slits 59, 60 and 61 thereon. Thus the sensor 55 can determine when the carrier reaches the desired vertical position corresponding to the desired sector 13, 14, or 15. A sectoral plate 30 is secured to the upper surface 12d of the casing 12 which encloses the sectors 13, 14 and 15 and is provided with a plurality of equally spaced slits 30a which extend radially outwardly from the inner edge thereof in correspondence with each cassette. A sensor 29 is secured to the cap portion 27 by means of a support bracket 58 as best seen in FIGS. 1 and 4. The sensor 29 is similar to the sensor 55 and is provided with a U-shaped detecting portion 29a which encompasses the edge of the sector plate 30 having the slits 30a therein whereby the carrier 31 may be selectively aligned with any desired cassette. The slits 59, 60 and 61 correspond to V=1, V=2, V=3, respectively while the slits 30a correspond to the storage spaces in each sector 13, 14 and 15.

A cassette gripping device 80 is moveable within the gripper housing 52 along a horizontal axis whereby the gripping device 80 may be brought into position for gripping a selected cassette and removing it from the storage compartment. The cassette gripping device is driven by means of a stepping or pulse motor 71 having a gear 72 fixed to the output shaft thereof which in turn is disposed in meshing engagement with a pair of gears 79, 79, each of which is fixedly secured to the left end portion 75a, 78a, of the shaft 75, 78, respectively. Each of the shafts 75, 78 is provided with spiral grooves 74 and 77, respectively, and each shaft is rotatably supported in a support plate 70 which is secured to the motor 71. The cassette gripping device 80, as best seen in FIGS. 13 and 14, is provided with main body 81 having a pair of holes 81a and 81a' for receiving the end portions 75b and 78b of the shafts 75 and 78, respectively. A pin (not shown) is fixedly secured in each hole 81a and 81a' and is disposed in sliding engagement with the groove 74 of the shaft 75 and the groove 77 of the shaft 78, respectively. Thus upon rotation of the shafts 75 and 78 by the motor 71, the cassette gripping device 80 will be moved horizontally toward or away from the cassette storage compartment depending on the direction of rotation of the motor 71. A pair of pivoted engaging members 85, 85' are pivotally mounted at the upper and lower corners of the holder 80 by means of pins 86, 86' for pivotal movement in a vertical plane between the main body 81 and a cover plate 83. The engaging members 85, 85' are provided with horizontal arm portions 85b and 85'b having pawl portions 85a and 85'a at the outer ends thereof respectively. Each engaging member 85, 85' is also provided with a vertical portion 85c, 85'c which are disposed at right angles to the respective horizontal portions. An intermediate lever 87 is pivoted at the upper and lower end portions 87a, 87b to the ends of the vertical portions 85c, 85'c by means of pins 88, 89, respectively. The upper and middle end portions of the lever 87 are biased by means of springs 91 and 91' to normally bias the horizontal portions 85b and 85'b of the engaging members 85, 85' into engagement with stopper portions 85d, 85'd, respectively. The middle portion of the lever 87 is loosely fitted into a groove 90b formed in the end of the shaft 90a of a solenoid 90 by means of a pin 94. The lever 87 may be moved to the right as viewed in FIG. 14 against the force of the springs 91 and 91' by movement of the shaft 90a upon energization of the solenoid 90.

The cassette gripping device 80 is provided with a set of vertically spaced optical sensors 92 and 93 which are disposed in opposition to the portions 18b, 18c, respectively, on the end portion 18a of a cassette 18. Upon movement of the cassette gripping device 80 towards the cassette 18 the pawls 85a, 85'a are brought into engagement with the concave portions 18f, 18g, formed at the upper and lower portions of the cassette 18 after passing over the projections 18d, 18e. During such movement of the pawls, the lever 87 is moved in the horizontal direction against the force of the springs with the result that the lever 87 moves between the bifurcated detecting portion 95a of an optical sensor 95 to provide a signal indicative of the engagement of the pawl with the cassette.

Figure 11:
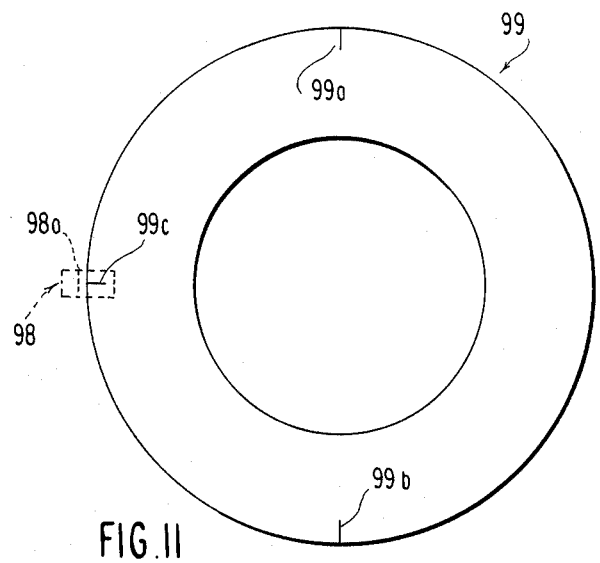
FIG. 11 is a detailed plan view of a sensing device for checking the rotation of the gripper.
Figure 12:
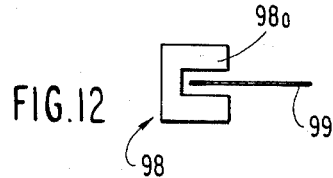
FIG. 12 is a partial elevation view of the sensing arrangement shown in FIG. 11.

With the pawls 85a and 85'a being disposed in gripping engagement with the selected cassette 18 the cassette gripping device 80 is retracted by means of the motor 71 and the rotating shafts 75 and 78 to withdraw the selected cassette 18 from the storage compartment to locate it within the gripper housing 52. While the carrier 31 is being moved in the vertical direction along the rails 25, 25, the gripping assembly with the cassette therein may be rotated through ninety degrees in either direction so as to properly orient the selected cassette for insertion into the processing device 17 through the slot 16. In order to rotate the gripping assembly, a stepping or pulse motor 97 is operatively connected to a gear 96 fixed to the base portion 52a of the gripper assembly 52 by means of a timing belt (not shown). A plate 99 rotatable with the gear 96, as illustrated in FIGS. 10-12, is provided with three slits 99a, 99b, and 99c. The edge of the slit 99 extends through the bifurcated detecting portion 98a of a sensor 98. While the slit 99c is normally disposed in alignment with the sensor 98 when the cassette is vertically disposed, the alignment of the slit 99a or 99b with the sensor 98 will confirm that a ninety degree rotation of the cassette has taken place in one direction or the other.

The carrier 31 is initially positioned at the original or home position which is detected by the sensor 56 on the carrier 31 which detects the projection 62 on the plate 58 and the sensor 100 on the base 11 which detects the projection 101 on the carrier 31, as shown in FIG. 2. Upon receiving the appropriate input information regarding the cassette to be selected the carrier 31 will move to bring the gripping assembly 52 into alignment with the selected cassette. The cassette will then be withdrawn from the storage compartment and transferred with the proper orientation to the processing device 17 whereupon the cassette will be inserted through the slot 16 for suitable processing. After processing the cassette will be withdrawn and returned to its storage compartment whereupon the carrier 31 will return to its home position unless it has received instructions for selecting a different cassette.

The overall sequential operation of the device 10 is controlled by the computer 50 which is connected to a main computer 102 which is operable under the control of a keyboard 103. A suitable CRT may be provided if necessary. When the data indicating the serial number of the cassette 18 to be selected and the data indicating the side of the disc in the cassette which is to be processed are transmitted from the keyboard 103 to the computer 50 the serial number data is stored in a register R1 and the disc side data is stored in a register R2. A table T corresponding to the serial numbers of the cassettes and corresponding coordinates is stored in the computer 50 and the input data with respect to the serial number of the selected cassette is compared to the table T so that the corresponding values of V and M are loaded into registers R3 and R4, respectively. The rotation of the motor 44 is controlled in accordance with the values in the register R3 and the rotation of the motor 24 is controlled in accordance with the values in the register R4 to move the carrier 31 the desired distance in the upward direction along the guides 25 and is rotated the carrier at the desired angle to bring the gripper assembly 52 of the carrier 31 into alignment with the selected cassette.

A check as to whether or not the carrier 31 is stopped at the correct position is performed by the sensors 55 and 29 as previously described. If the position of the carrier 31 is not correct the resulting or abnormal condition so detected is processed by the computer and an alarm mechanism 104 such as a buzzer or the like is actuated for the attention of an operator.

After confirming that the carrier 31 is in the correct position, the motor 71 is brought into operation under the control of the computer 50. The proper number of rotations of the shaft of the motor 71 are carried out so that the shafts 75 and 78 are rotated the desired amount so that the cassette gripping device 80 is moved into connective engagement with the cassette. A check as to whether the cassette gripping device is moved the desired distance is performed by counting the number of times the slit 73a of the plate 73 is detected by the sensor 84. Such a count is fed into the register R6 and the content thereof is compared to a set rotational member for the shaft of the motor 71 in a register R5. Unless the vlaue in the register R6 is equal to that in the register R5 a signal of the abnormal condition is transmitted to the alarm mechanism 104 by the computer 50.

A check as to whether or not the selected cassette is properly held by the cassette gripping device 80 is performed as a result of the lever 87 being moved into detecting position relative to the sensor 95 as described above when the gripping pawls move over the projections 18d and 18e on the cassette. If the sensor 95 detects the movement of the lever 87 a "1" is fed into the register R7. If the cassette 18 is not held by the gripping device for any reason whatsoever a "0" is fed into the register R7 and the rotation of the motor 71 is stopped. Such a condition is detected by the computer 50 which in turn actuates the alarm mechanism 104.

After receiving confirmation that the cassette 18 is held by the cassette gripping device 80, the sensors 92 and 93 are brought into operation to sense a reflection of the mark 94. Upon sensing a reflection of the mark 94 by the sensor 92 or 93 the "1" is fed into the register R8 or R9, respectively. Otherwise a "0" is fed into the register R8 or R9, respectively. In this embodiment if the sensor 92 senses a mark 94 and the sensor 93 senses no mark a "1" and a "0" are fed to the register R8 and the register R9, respectively. If the value in the register R8 and the value in the register R9 are equal to each other, the computer 50 issues an alarm through the alarm mechanism 94 which indicates trouble in one sensor or the other and/or the existence of no mark 94. If the value of the register R8 differs from the value of the register R9 the motor 71 is driven in the reverse direction so as to return the cassette gripping device 80 with the cassette 18 to its position within the gripping assembly 52.

After completion of the return movement of the cassette gripping device 80, the carrier 31 is transferred to the loading or inserting position by driving motors 24 and 44. During the transfer movement of the carrier 31 the side of the disc in the cassette 18 to be played is directed upwardly by rotating the gripping assembly 52 through a ninety degree angle depending upon the value in the register R2 and the value in the register R8. A check as to whether or not the ninety degree rotation of the gripper 52 is correctly carried out is performed by the detection of the slit 99a or 99b in the plate 99 by means of the sensor 98.

As soon as the carrier 31 is transferred to the loading position the cassette gripping device 80 is projected outwardly of the gripping assembly 52 for insertion of the cassette 18 into the processing device 17 through the opening 16. After the completion of the cassette insertion into the processing device 17, the cassette gripping device 80 releases the cassette 18 and is then retracted into the gripping assembly 52. The processing device 17 is then brought into operation with respect to the cassette 18 therein. Picture images on the disc can be seen by means of a CRT. Upon completion of the processing of the cassette 18, the cassette 18 is automatically withdrawn through the opening 16 in the processing device 17 by means of the cassette gripping device and is then returned to its original storage compartment by means of the carrier 31. The carrier 31 is then transferred to its original position in readiness for the next operation. For releasing the cassette 18 from the cassette gripping device 80 a solenoid 90 is energized to retract the shaft 90a thereby pivoting the pawls out of engagement with the corner portions of the cassette 18.

While the invention has been particularly shown and described with reference to preferred embodiments thereof it will be understood by those in the art that the foregoing and other changes in form and details may be made therein without departing from the spirit and scope of the invention.

What is claimed is:

1. A device for storing, retrieving, processing and returning cassettes of the type having a disk therein adapted to have recorded information on opposite sides thereof, comprising:
    a base plate;
    a semicylindrical casing disposed on said base plate and comprised of a plurality of vertically stacked sector-shaped sections having a common vertical axis, each of said sections being provided with a plurality of cassette storage compartments for storing a plurality of radially disposed cassettes with each cassette disposed in a vertical plane extending radially from said vertical axis;
    guide means comprising a support member pivotally mounted on said base plate for rotation about a vertical axis corresponding to the vertical axis of said sectors and a pair of parallel, spaced apart guide rails extending vertically upwardly from said support means;
    a first driving means for rotating said support member about said vertical axis to any desired angle;
    carrier means including a main body mounted on said guide rails for movement therealong,
    a gripper assembly rotatably mounted on said main body including a cassette gripping device movably mounted in said gripper assembly for holding one of said cassettes;
    a second driving means for moving said main body of said carrier means in the vertical direction along said guide rails;
    a third driving means for moving said cassette gripping device relative to said gripper assembly;
    a fourth driving means for rotating said gripper assembly about a horizontal axis relative to said main body during transfer of said carrier means to a loading position for rotating a selected cassette between a vertical and a horizontal disposition;
    processing means for receiving a horizontally disposed cassette transferred by said carrier means to record or play back information from one side of a disk in the cassette; and
    central control means for controlling said first, second, third and fourth driving means in the proper sequence.

2. A device for storing and retrieving cassettes as set forth in claim 1 wherein said gripper assembly includes outer means having a shaft operatively connected to said cassette gripping device for moving said cassette gripping device radially toward and away from said sectors and said processing means, said cassette gripping means having a pair of pivoted pawl members mounted adjacent the top and bottom edges thereof for cooperation with complementary recesses in an end of a cassette, spring means normally biassing said pawl means into engagement with said recess means in said cassette and solenoid means operatively connected to said pawl means for pivoting said pawl means out of engagement with said recesses in said cassette.

3. A device for storing and retrieving cassettes as set forth in claim 1 further comprising first indicator means mounted on said support member parallel to said rails having marks thereon opposite each of said vertically stacked sectors, first sensor means mounted on said carrier means for detecting said marks on said first indicator means to correctly position said carrier means relative to a selected sector, second indicator means comprising a sector plate secured to the top of said casing and having a plurality of marks each indicative of a radially disposed cassette, second sensor means operatively associated with said second indicator means for sensing a selected slit to operatively locate said gripping assembly relative to a specific cassette, third indicator means carried by said gripping assembly and having marks thereon indicating the rotational position of said gripper assembly and third sensor means cooperating with said indicator means to determine the orientation of a cassette prior to insertion in said processing means.

* * * * *